United States Patent
Sanderson et al.

(10) Patent No.: US 7,777,165 B2
(45) Date of Patent: Aug. 17, 2010

(54) METHODS AND APPARATUS FOR ADJUSTABLE SURFACES

(75) Inventors: Terry M. Sanderson, Tucson, AZ (US); Jamie W. Clark, Metamore, IL (US)

(73) Assignee: Raytheon Company, Waltham, MA (US)

( * ) Notice: Subject to any disclaimer, the term of this patent is extended or adjusted under 35 U.S.C. 154(b) by 624 days.

(21) Appl. No.: 11/670,736

(22) Filed: Feb. 2, 2007

(65) Prior Publication Data

US 2009/0206192 A1  Aug. 20, 2009

(51) Int. Cl.
   *B64C 13/00* (2006.01)
(52) U.S. Cl. .................................. 244/3.27; 244/99.8
(58) Field of Classification Search ............... 244/3.27, 244/3.24, 99.8, 99.2, 218, 3.2
   See application file for complete search history.

(56) References Cited

U.S. PATENT DOCUMENTS

| | | | |
|---|---|---|---|
| 2,559,827 A | 7/1951 | Northrop | |
| 5,049,591 A | 9/1991 | Hayashi et al. | |
| 2,082,207 A | 1/1992 | Tulinius | |
| 5,181,678 A | 1/1993 | Widhall et al. | |
| 6,010,098 A * | 1/2000 | Campanile et al. | 244/219 |
| 6,264,136 B1 | 7/2001 | Weston | |
| 6,705,568 B2 | 3/2004 | Lee | |
| 6,834,835 B1 | 12/2004 | Knowles et al. | |
| 2002/0195177 A1 | 12/2002 | Hinkley et al. | |
| 2004/0086699 A1 | 5/2004 | Schneider | |
| 2007/0107189 A1 | 5/2007 | Prichard et al. | |

FOREIGN PATENT DOCUMENTS

| | | |
|---|---|---|
| CN | 101028866 A | 9/2007 |
| EP | 1607603 A2 | 12/2005 |
| GB | 2445099 A | 6/2008 |
| WO | 03068584 A1 | 8/2003 |
| WO | 2007001392 A2 | 1/2007 |

OTHER PUBLICATIONS

Perkins, David A. et al "Morphing Wing Structures for Loitering Air Vehicles," 45th AIAA/ASME/ASCE/AHS/ASC Structures, Structural Dynamics & Materials Conference, 1 page, Apr. 19-22, 2004, Palm Springs, California.

Shaw, John A. et al. "The Manufacture of NITI Foams," Proceedings of 2002 ASME International Mechanical Engineering Congress and Exposition, 10 pages, Nov. 17-22, 2002, New Orleans, Louisiana.

* cited by examiner

*Primary Examiner*—Timothy D Collins
(74) *Attorney, Agent, or Firm*—Ingrassia Fisher & Lorenz, P.C.

(57) ABSTRACT

Methods and apparatus for systems having deployable elements according to various aspects of the present invention comprise a system including a deployable surface and an adaptive actuator including a polymer foam. In one embodiment, the system comprises a vehicle including a deployable wing comprising an exterior surface. The exterior surface may be adjusted by adjusting the shape, size, position, and/or orientation of the adaptive actuator.

24 Claims, 7 Drawing Sheets

METHODS AND APPARATUS FOR ADJUSTABLE SURFACES

BACKGROUND OF THE INVENTION

In some structures, it may be desirable to selectively adjust the surface characteristics. As a basic example, most aircraft wings include flaps, which may be engaged to modify the drag and lift characteristics of the aircraft. Additionally, projectiles such as cruise missiles often include adjustable control surfaces to modify the trajectory of the projectile in flight.

At the other end of the spectrum, the entire wing may be configured to adjust. For example, the Grumman F-14 Tomcat features a variable geometry wing design. This variable geometry wing design provides the F-14 with one aerodynamic surface configuration suited to low velocity as well as another configuration for high velocity. A mechanical system controls the disposition of the wings. Mechanically adjusting the control surface, however, disrupts the airflow, reducing aerodynamic efficiency and undercutting the benefit of the functionality.

Various other schemes for extending and dynamically changing wing and control surface configurations have been developed, but have various limitations. For example, many systems can only extend a relatively small amount before reaching a mechanical limit. In addition, many such systems create uneven airflow surfaces.

In addition to in-flight surface adjustments, an aerodynamic system may require an in-flight surface geometry which would be inappropriate for storage and/or launch of the system. For example, in projectiles which are fired from a tube, the internal geometry of the launch mechanism may place constraints on the use of canards. As such, canards are sometimes configured to stow inside of or flush with the projectile for deployment after launch. As with mechanically adjusted wings, deployable canards are generally actuated with mechanical systems, reducing reliability and increasing cost.

SUMMARY OF THE INVENTION

Methods and apparatus for systems having deployable elements according to various aspects of the present invention comprise a system including a deployable surface and an adaptive actuator including a polymer foam. In one embodiment, the system comprises a vehicle including a deployable wing comprising an exterior surface. The exterior surface may be adjusted by adjusting the shape, size, position, and/or orientation of the adaptive actuator.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of techniques, technologies, and methods configured to perform the specified functions and achieve the various results. For example, the present invention may employ various materials, coatings, actuators, electronics, shape memory materials, airflow surfaces, reinforcing structures, and the like, which may carry out a variety of functions. In addition, the present invention may be practiced in conjunction with any number of devices, and the systems described are merely exemplary applications. Further, the present invention may employ any number of conventional techniques for launching vehicles, deforming materials, reinforcing materials, providing and controlling control surfaces, adjusting the surface area of a surface, and the like.

Figure 1:
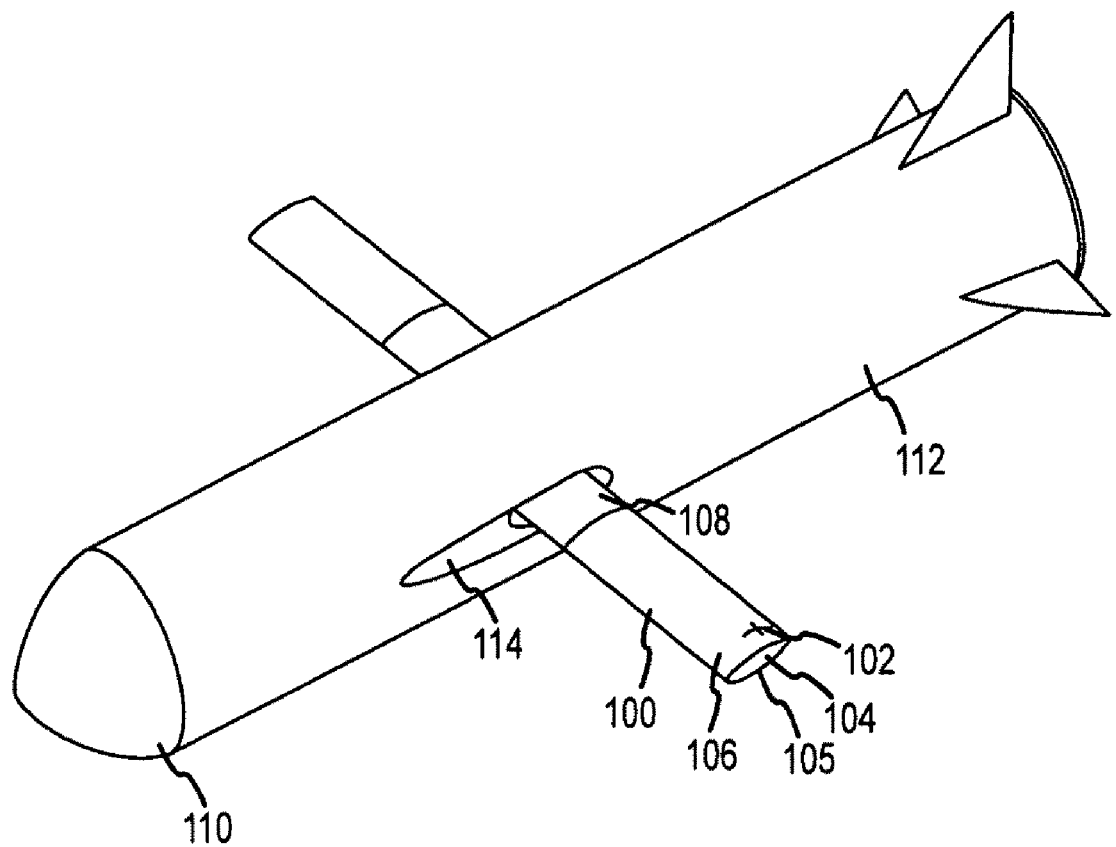
FIG. 1 is a view of a projectile with a selectively adjustable control surface.

Methods and apparatus for an adjustable surface according to various aspects of the present invention may be implemented in conjunction with a deployable element 100 of a vehicle. The methods and apparatus may be implemented in conjunction with any system utilizing a deployable element 100, however, such as a vehicle, propeller, turbine, or other system configured to translate and/or rotate. Referring to FIG. 1, a deployable element 100 according to various aspects of the present invention is implemented in conjunction with a projectile 112, in which the deployable element 100 comprises a deployable wing 104. In addition, the projectile 112 may comprise a control system 110 to selectively control the wing 104, such as to move at least a portion the wing 104.

The projectile 112 comprises a system that travels, rotates, and/or translates, such as a manned or unmanned vehicle. The projectile 112 may comprise any appropriate system, such as a vehicle, rocket, missile, aircraft, guided or unguided bomb, submarine, propeller, turbine, artillery shell, or torpedo. In the present embodiment, the projectile 112 comprises a missile, such as a military missile for delivering a warhead, or an unmanned aerial vehicle, such as a remotely controlled aircraft configured to perform reconnaissance missions and/or deliver munitions to a target. The projectile 112 may also be configured to fly at a variety of speeds, such as low subsonic speeds, for example to loiter over an area to be monitored, as well as high subsonic or supersonic speeds, for example to cruise to a target area. Accordingly, the projectile 112 may include appropriate systems for the particular application or environment, such as guidance systems, reconnaissance equipment, warheads, communications equipment, cargo bays, crew interfaces, and propulsion systems.

The deployable element 100 may be configured to move or otherwise change state. In the present exemplary embodiment, the deployable wing 104 is attached to the fuselage of the projectile 112 and at least partially controls the flight of the projectile 112. The deployable wing 104 comprises a surface for controlling the flight of the projectile 112, such as a wing, fin, stabilizer, aileron flap, slat, rudder, elevator, or other surface. In alternative embodiments, however, the deployable element 100 may comprise any system or element that selectively moves.

Figure 2A:
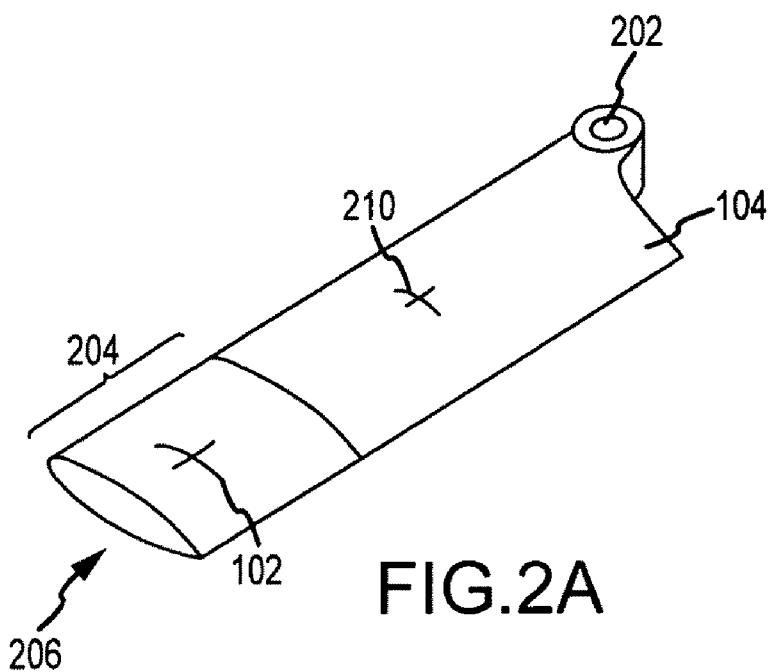
FIGS. 2A-B are views of a selectively adjustable control surface.
Figure 2B:
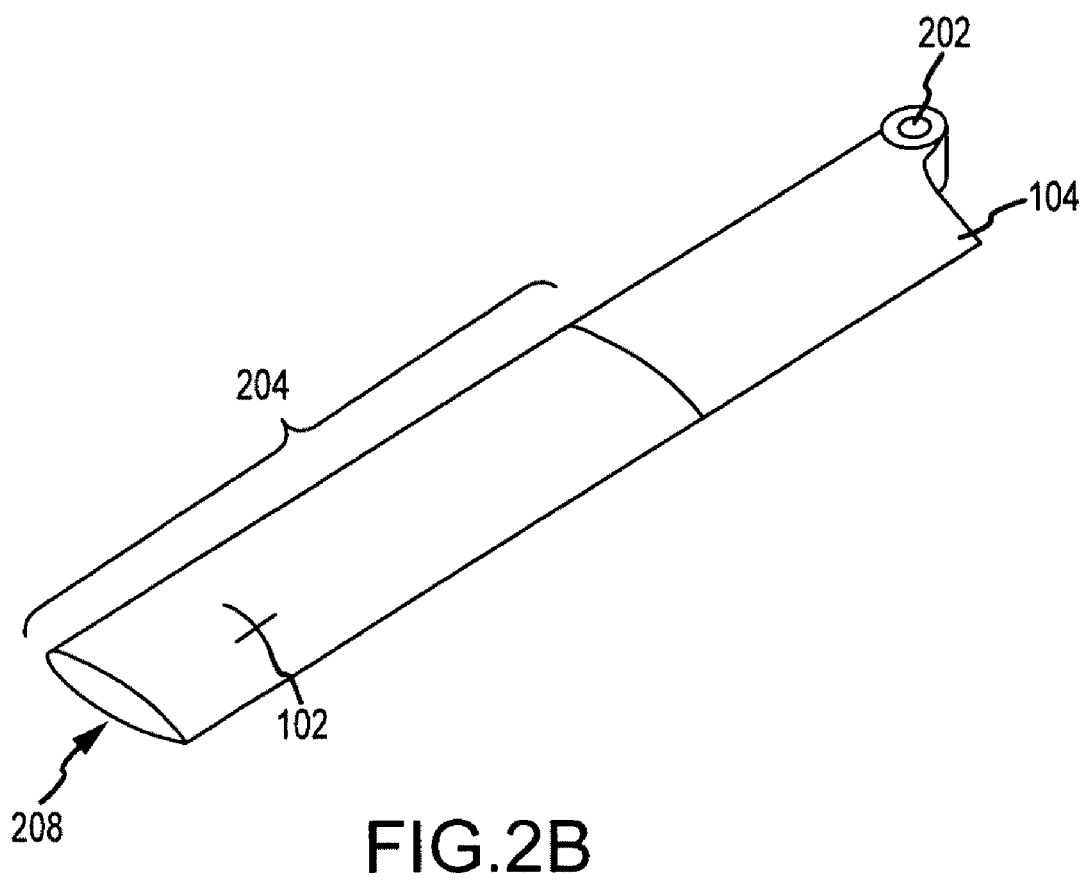

In the present embodiment, the deployable wing 104 may be extended and retracted to adjust the surface area of the wing 104, for example according to the speed of the projectile 112. The wing 104 may be configured in any manner to facilitate the adjustment of the wing 104 surface area, configuration, position, or size. In the present embodiment, the wing 104 may be selectively extended and retracted in conjunction with an exterior surface 102 and an adaptive actuator 105. The exterior surface 102 comprises a surface exposed to airflow, exhaust, or the like for controlling the projectile 112, such as a conventional lift surface, control surface, or other surface configured to interact with a fluid. The adaptive actuator 105 controls the configuration of the exterior surface 102. For example, referring to FIGS. 2A-B, the adaptive actuator 105 may be configured to define the exterior surface 102 of the deployable wing 104 in an extended position 208. In the extended position 208, the wing length 204 and the exterior surface 102 area may be configured for low speed flight. The adaptive actuator 105 may further be configured to define the exterior surface 102 of the deployable wing 104 in a retracted position 206. In the retracted position 206, the wing length 204 and the exterior surface 102 area may be configured for higher speed flight to enhance aerodynamic efficiency.

The exterior surface 102 of the present embodiment comprises the adjustable exterior surface of the deployable wing 104. The exterior surface 102 may be configured to selectively modify the aerodynamic properties of the projectile 112, for example by changing the orientation, position, shape, and/or size of the exterior surface 102. In addition, the wing 104 may be adjusted for non-flight purposes, for example to place the projectile 112 in a stowed position. In the present embodiment, the exterior surface 102 may be moved between a fully extended position 208, a fully retracted position 206, and intermediate positions between the fully extended and fully retracted positions 208, 206 to modify the aerodynamic properties of the exterior surface 102. For example, at low velocities, it may be desirable to configure the first exterior surface 102 for high lift. While increasing the effective area of the exterior surface 102 may increase drag as well as lift, at low velocities the benefit of increased lift may outweigh the detriment of increased drag. At high velocities, it may be desirable to configure the exterior surface 102 for low drag. While decreasing the effective area of the exterior surface 102 may decrease lift as well as drag, at high velocities the benefit of decreased drag may outweigh the detriment of decreased lift. In alternative embodiments, the exterior surface 102 may be otherwise modified, for example to adjust the cross-sectional height or length of the wing 104 or the angle of the wing 104 relative to the fuselage, to fold and/or move the wing 104 for stowage, or to otherwise affect the properties of the projectile 112.

The exterior surface 102 may also include surface geometries configured to modify the aerodynamic properties of the control surface 104. For example, the exterior surface 102 may include grooves configured to affect the flow of air over the exterior surface 102. As another example, the exterior surface 102 may be configured to use the flow of fluid over the exterior surface 102 to generate force for lift or control of the projectile 112.

The exterior surface 102 may comprise any material for facilitating airflow and adjustment of the size and/or shape of the exterior surface, such as cloth, plastic, metal, ceramic, and/or other appropriate materials. For example, the exterior surface 102 may comprise a flexible skin or coating disposed over the exterior of the wing 104 and configured to fold, unfold, stretch, and/or retract in response to the status of the adaptive actuator 105. In the present embodiment, the exterior surface 102 comprises an exterior surface of the adaptive actuator 105, such that when the adaptive actuator 105 extends and/or retracts, the exterior surface 102 extends and/or retracts accordingly. Further, the exterior surface 102 may be graded, as by abrading, surface treatment, and/or the like, or otherwise coated so as to substantially eliminate surface porosity.

The adaptive actuator 105 defines and controls the configuration of the exterior surface 102. Further, the adaptive actuator 105 may provide at least part of the force to move the elements of the deployable element 100, for example to extend and/or retract the wing 104. The adaptive actuator 105 may be implemented in any appropriate manner to deform, for example in response to movement of the support module 108, to an independent mover such as a pneumatic or hydraulic mover, mechanical actuator, servo, motor, and/or to an actuating condition. In the present embodiment, the adaptive actuator 105 defines the properties of the exterior surface 102. The adaptive actuator 105 may affect the position, orientation, size, and/or shape of the exterior surface 102. The adaptive actuator 105 may be attached to the exterior surface 102 so that movement of the adaptive actuator 105 is translated to the exterior surface 102. In one embodiment, the exterior surface 102 is rigidly attached to the adaptive actuator 105, for example by supports between the adaptive actuator 105 and the exterior surface 102. In another embodiment, the exterior surface 102 is a surface of the adaptive actuator 105, such that the exterior surface 102 is integrated into the adaptive actuator 105. Alternatively, the exterior surface 102 may engage the adaptive actuator 105, such as a coating applied to the exterior of the adaptive actuator 105.

In the present embodiment, the adaptive actuator 105 includes a material configured to selectively change shape and/or size in response to a signal. The adaptive actuator 105 may comprise, for example, a polymer foam 106, such as a conventional polymer foam or a shape memory polymer foam that changes size and/or shape in response to a signal or other control mechanism. The polymer foam 106 may be configured for reversible deformation or irreversible deformation.

The adaptive actuator 105 may support the exterior surface 102. For example, the exterior surface 102 may be supported by the polymer foam 106, applied to the polymer foam 106, and/or integrated into the polymer foam 106. In one embodiment, the exterior surface 102 comprises the outer surface of the polymer foam 106. As another example, the exterior surface 102 may comprise a coating applied to and/or formed on or in the polymer foam 106. As yet another example, the exterior surface 102 may be substantially flush against polymer foam 106.

Figure 3A:
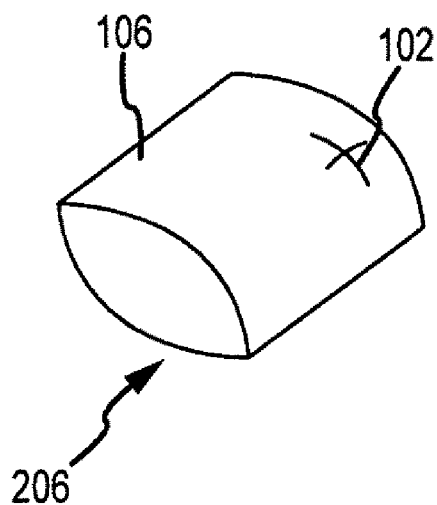
FIGS. 3A-B are views of a polymer foam having an exterior surface.
Figure 3B:
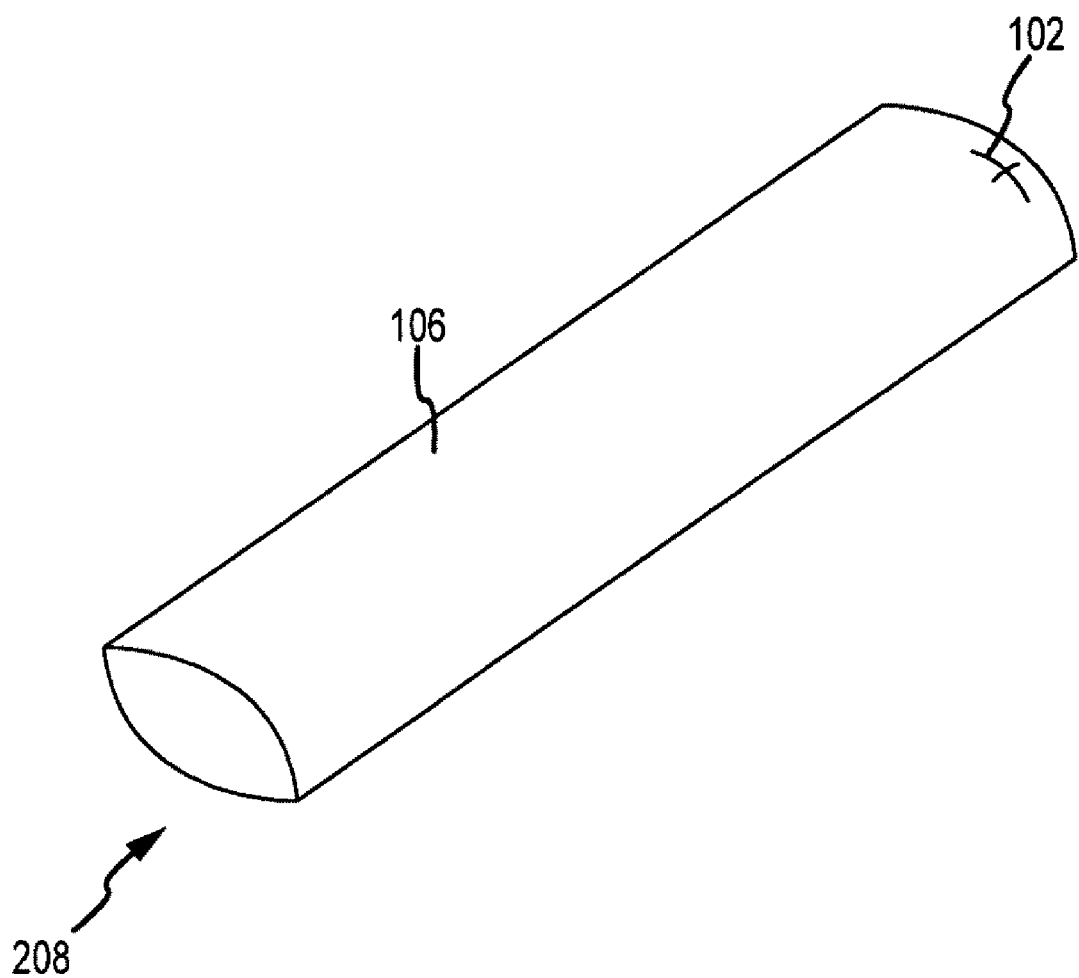

By controlling the shape and/or size of the adaptive actuator 105, the size and/or shape of the exterior surface 102 may be adjusted. For example, referring to FIGS. 3A-B, to extend the wing 104 for low speed flight, the polymer foam 106 may be extended away from the fuselage of the projectile 112 to the extended position 208 to increase the area of the wing 104. Conversely, to retract the wing 104 for higher speed, the polymer foam 106 may be retracted to the retracted position 206 to reduce the area of the wing 104.

The adaptive actuator 105 may be configured for a particular actuation response time. For example, in a given application, such as a pursuit vehicle, it may be desirable to have a polymer foam 106 that is configured to deform relatively quickly to facilitate rapid acceleration and deceleration. In other applications, such as a weather monitoring aircraft, the polymer foam 106 may deform more slowly.

The adaptive actuator 105 may also be selected and/or configured for a specified material property. For example, for a high velocity projectile 112, the polymer foam 106 may be selected and/or configured to withstand high stresses and/or high fluctuations in temperature. For an application demanding low power consumption, the polymer foam 106 may be selected and/or configured to deform in response to a low power signal. In an application where the polymer foam 106 may experience significant variations in temperature during operation, the polymer foam 106 may be selected and/or configured for low thermal expansion to maintain the surface properties of the polymer foam 106 over the relevant temperature range.

Any appropriate adaptive actuator 105 may be utilized according to application and/or environment. In addition to various deformation processes and mechanisms, the adaptive actuator 105 may comprise various materials, dimensions, and geometries, and may be selected according to any appropriate criteria, such as structural integrity, stiffness, strength, actuation power requirements, lateral expansion and contraction characteristics, and/or thermal response characteristics. For example, the adaptive actuator 105 may comprise alloys such as nitinol. The adaptive actuator 105 may also comprise polymers such as urethane, styrene-butadiene, crystalline diene, norbornane, and/or the like. The adaptive actuator 105 may be embedded with particles to modify the material properties of the adaptive actuator 105. For example, the adaptive actuator 105 may be embedded with nanoparticles, such as $C_{60}$ molecules, to improve properties such as stiffness, strength, in-flight heating rate, and/or thermal conductivity of the adaptive actuator 105. The adaptive actuator 105 may be selected and configured according to any appropriate criteria, including the material properties requirements of the system, the behavior of a given material, durability, allowable volumetric expansion, and/or the like.

The adaptive actuator 105 may be substantially porous. In the present embodiment, the adaptive actuator 105 comprises polymer foam 106 that is a substantially porous material. Various polymer foam 106 materials may achieve volumetric deformations of 400% or more without substantial cross-sectional deformation. The polymer foam 106 is shaped to provide a desired exterior surface configuration, such as an airfoil. The polymer foam 106 is oriented to deform laterally with respect to the projectile 112 fuselage in response to the relevant signal to extend or retract the wing 104. In addition, the polymer foam 106 is configured to exhibit minimal cross-sectional deformation so that the wing 104 cross-section remains substantially constant regardless of the extension or retraction of the wing 104. While shape memory polymer may be configured to achieve reversible deformation of up to 20% of an initial length, polymer foams such as shape memory foams may be configured to achieve reversible deformation of 400% of an initial length or more. A foam material achieves much greater deformations than a non-porous material because the deformation mechanism within a foam material is primarily foam cell collapse and expansion.

Figure 4C:
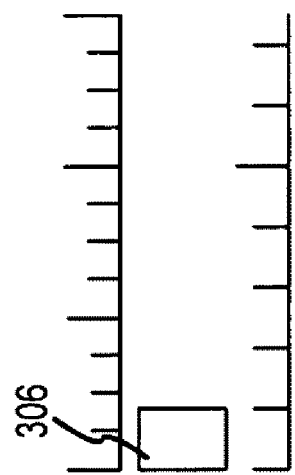
FIGS. 4A-C are views of a polymer foam having multiple positional states.
Figure 4B:
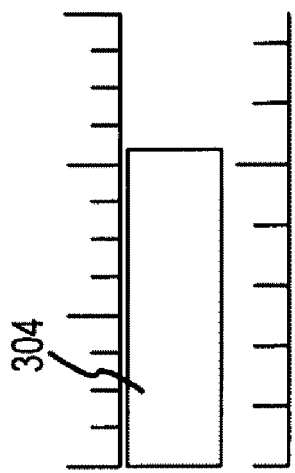
Figure 4A:
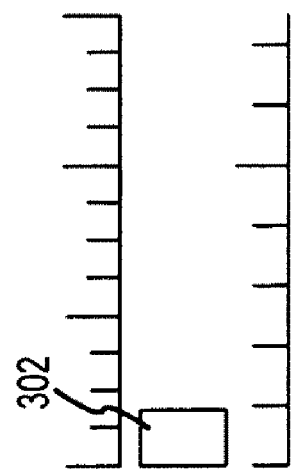

For example, referring now to FIGS. 4A-C, a cylindrical piece of polymer foam 106 may have a first position 302 (FIG. 4A) and a second position 304 (FIG. 4B). Comparing the first position 302 and the second position 304, the circular cross section is substantially constant. Contrasting the first position 302 and the second position 304, the length in the direction of deformation is substantially different. The cylindrical piece comprises polymer foam 106 configured to deform at least about 50%, such as at least about 100%, 200%, 300%, or 400% along the axis of deformation. In one embodiment, the cylindrical piece may be comprised of a shape memory material having a Poisson's ratio of about 0. Accordingly, the cylindrical piece may be configured to provide a substantially constant cross sectional area and a first and second length corresponding to the first and second position 302/304. In another embodiment, the cylindrical piece may comprise polymer foam 106 configured for reversible deformation. Specifically, the cylindrical piece may be configured to deform from a first position 302 to a second position 304 and back to a first position 302/306 (FIG. 4C).

The adaptive actuator 105 may respond to any appropriate signal, such as an electrical, optical, acoustic, mechanical, pneumatic, magnetic, thermal, chemical, or other suitable signal. In the present embodiment, the signal may be selected according to the polymer foam 106. For example, the polymer foam 106 may deform in response to a thermodynamic condition such as temperature change, an electromagnetic condition such as a magnetic field, or a chemical condition such as a specified reactive chemical.

For example, the adaptive actuator 105 may comprise a polymer foam 106 such as shape memory foam configured to exhibit specific behavior in relation to the glass transition temperature, $T_g$, of the material 106. The polymer foam 106 may be configured such that in the glassy state, the polymer foam 106 has the consistency and general characteristics of a durable plastic. To the extent that $T_g$ corresponds to the normal operating conditions of the system 100 when stored and/or prior to deployment, the adaptive actuator 105 is highly durable. At temperatures above $T_g$, the polymer foam 106 may be deformed and the polymer foam 106 may substantially retain the deformed shape. As the temperature of the polymer foam 106 is decreased, the polymer foam 106 substantially retains the deformed shape. When the polymer foam's 106 temperature is subsequently raised above $T_g$, the polymer foam 106 returns to its original shape. This property may be described as hibernated elastic memory in the rigid state.

For a specified electromagnetic condition, the adaptive actuator 105 may exhibit specific behavior in relation to the potential difference, E, across the adaptive actuator 105. For instance, at voltages below E, the adaptive actuator 105 may have a first position or form 206. When the potential difference across the adaptive actuator 105 is raised to exceed E, the adaptive actuator 105 may move to a different form or position 208. An example of this type of material is artificial muscle tissue.

The adaptive actuator 105 may also be configured to operate in relation to a specified magnetic field. For example, the polymer foam 106 may assume one position 206 when a magnetic field is insubstantial or a particular polarity and a second position 208 when the magnetic field is activated or reversed. For example, alignment of ferromagnetic particles within the polymer foam 106 may cause desired deformation of the polymer foam 106. Alternatively, the polymer foam 106 may respond to a specified charge. For example, deformation of the polymer foam 106 may be in response to repulsive forces generated between particles of disparate materials comprising the polymer foam 106 in the presence of an electrostatic charge.

The adaptive actuator 105 may also be configured to operate in relation to a specified electric field. For example, the polymer foam 106 may assume one position 206 when an electric field is insubstantial and a second position 208 when the electric field is activated. For example, an electric field imparted via a plurality of capacitors or resistors embedded within the polymer foam 106 may excite the polymer molecules and heat the polymer foam 106 to a specified temperature.

In addition, the adaptive actuator 105 may respond to a particular chemical. When a specified chemical is applied to or sufficiently interspersed in the polymer foam 106, the polymer foam 106 may deform from a first position to a second position 208. For example, the deformation may be caused by a thermodynamic component of the reaction between the specified chemical and the polymer foam 106. As another example, the deformation may be caused by a volumetric difference between the polymer foam 106 prior to the reaction and the polymer foam 106 after the reaction.

The control system 110 controls the operation of the adaptive actuator 105 to control the deployment of the wing 104. For example, the control system 110 may be configured to selectively actuate the polymer foam 106 and/or the exterior surface 102. The control system 110 may comprise an independent control system or may be integrated into other systems, such as guidance and/or communications systems.

The control system 110 may control the deployable element 100 according to any criteria. For example, the control system 110 may control the deployable element 100 in response to remote communications, sensed conditions, pre-programmed timing or conditions, and the like. For example, the control system 110 may be configured to approximate a trajectory based on guidance elements like an inertial guidance system or a global positioning receiver, evaluate the current trajectory of the projectile 112 based on the approximate trajectory and a desired trajectory, and actuate the control surface 104 accordingly. As another example, the control system 110 may be configured to detect electromagnetic radiation as reflected by a target and actuate the control surface 104 accordingly. As yet another example, the control system 110 may be configured to receive instructions from a remote source or determine an elapsed time and actuate the control surface 104 accordingly.

The control system 110 may be configured to operate the adaptive actuator 105 in any appropriate manner. In one embodiment, the control system 110 may include a control interface substantially integrated into the polymer foam 106. For example, the control interface may comprise a wire mesh configured for Ohmic heating at least partially enclosed by the polymer foam 106. As another example, the control interface may comprise a packet of chemicals configured to selectively provide an exothermic reaction in response to a signal or condition. As yet another example, the control interface may comprise capacitor plates embedded within various segments of the adaptive actuator 105 and configured to induce heating of the adaptive actuator 105 by virtue of the capacitor's electric field. Further, the control interface may be configured to expose the adaptive actuator 105 to a specified wavelength of electromagnetic radiation. Alternatively, the control interface may be substantially separated from the polymer foam 106. For example, the control interface may comprise connections to provide electrical, pneumatic, magnetic, or other signals to the polymer foam 106. In another embodiment, the control interface may be an inherent feature of the operating environment of the projectile 112, such as the ambient temperature at 10,000 feet, such that the adaptive actuator 105 deploys automatically in response to the relevant ambient temperature.

The configuration of the control system 110 may be substantially related to the material comprising the adaptive actuator 105. For example, some materials such as shape memory foams may deform in response to a specific actuation method such as increasing the temperature of the material, imparting a magnetic field within the material, and/or the like. Accordingly, the control system 110 may be configured to accommodate actuation of such materials. Other materials may be deformed via tensile forces, such as may be imparted by an expansive member, such as the support module 108, enclosed by the material. Accordingly, the control system 100 may be configured to adjust the properties of such an expansive member to adjust the properties of the adaptive actuator 105. Further, some adaptive actuator 105 materials may be suited to a plurality of actuation mechanisms. For example, some polymer foams 106 may respond more efficiently to an expansive member when the polymer foam 106 is heated to a specified temperature. Accordingly, the control system 110 may be configured to heat the polymer foam 106 to a specified temperature as well as actuating the expansive member.

The deployable element 100 may be coupled to another portion of the projectile 112 in any appropriate manner, such as rigidly, resiliently, or movably. For example, the wing 104 may be integrated into the projectile 112 or attached using conventional connectors, such as rivets, adhesives, welds, and the like. Referring again to FIG. 1, in one embodiment, the present wing 104 is disposed on a support module 108. The support module 108 is connected to the projectile 112 fuselage, and the adaptive actuator 105 is supported and/or actuated by the support module 108.

The support module 108 may comprise various materials, dimensions, and geometries. The support module 108 may further be configured according to any appropriate criteria relevant to the application and/or environment, such as the intended durability of the projectile 112, the intended environment in which the projectile 112 is to operate, the operational stresses within the wing 104, the maximum allowable mass of the support module 108, the size and operating properties of the projectile 112, the dimensions and geometries of the exterior surface 102, the extent to which the support module 108 is to lift and/or drag to the projectile 112, and/or the like.

The support module 108 may perform various functions, including connecting the wing 104 to the projectile 112 fuselage. For example, the support module 108 may support the polymer foam 106 and/or impart deformation within the adaptive actuator 105. In addition, the support module 108 may mitigate deflection, such as may be caused by gravity, drag, lift, etc., in operation of the adaptive actuator 105. Further, the support module 108 may maintain the surface geometry of the adaptive actuator 105.

Figure 5A:
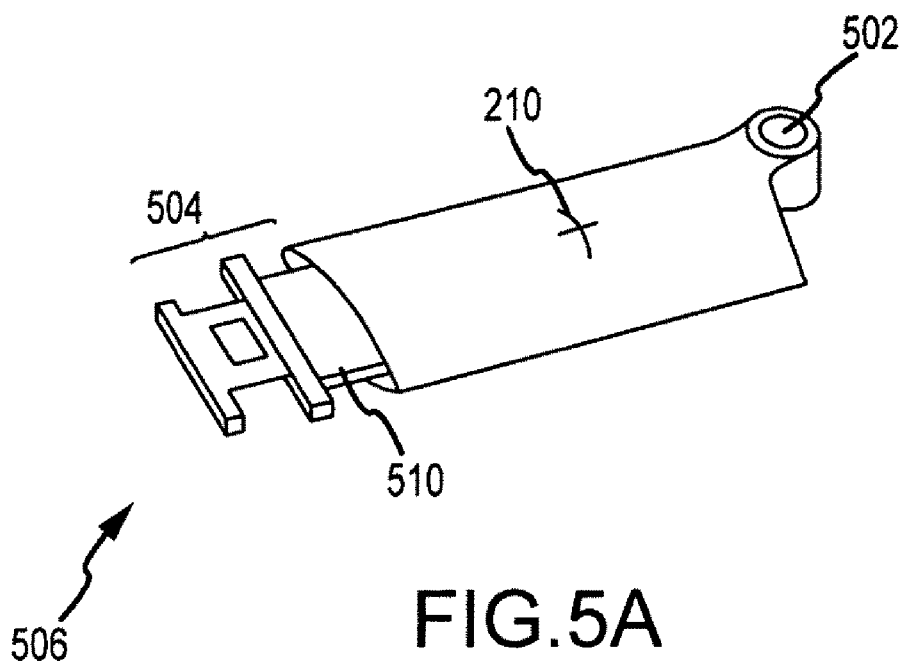
FIGS. 5A-B are views of a support module.
Figure 5B:
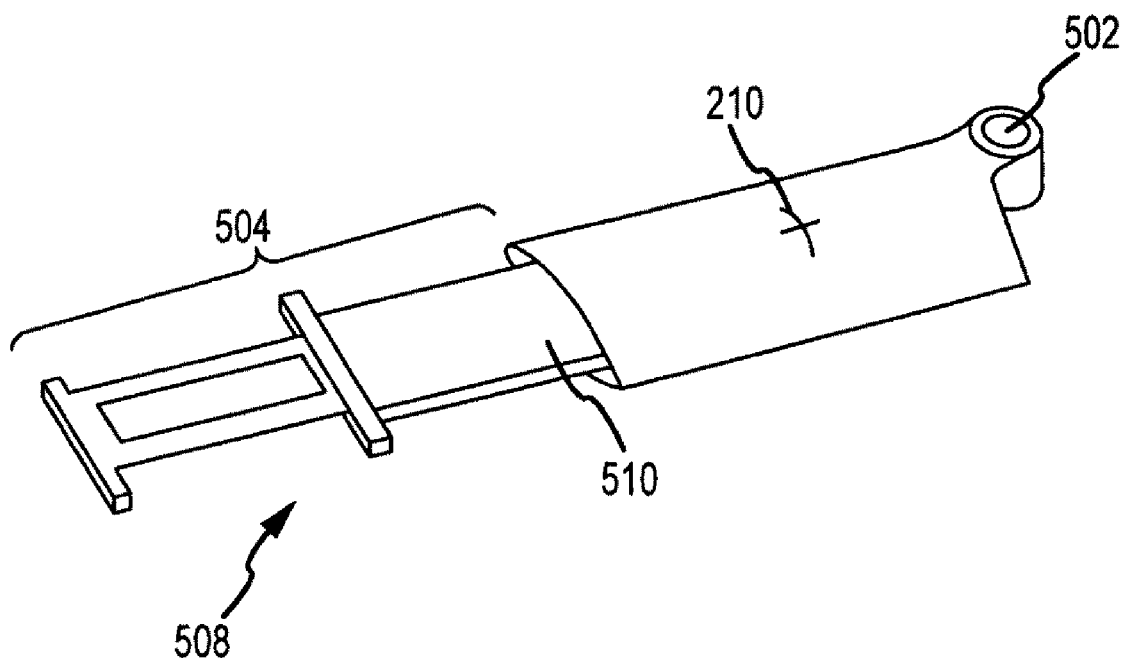

Referring to FIGS. 5A-B, the support module 108 may include any elements for connecting the wing 104 to the projectile 112 fuselage and any other relevant functions, such as a bearing couple 502, a module cover 210, and a brace 504. The bearing couple 502 may couple the support module 108 and the polymer foam 106 to the projectile 112 fuselage. The module cover 210 covers the connection point between the wing and the projectile fuselage and/or provides aerodynamic properties to the wing 104. The brace 504 provides structural support to the polymer foam 106.

The support module 108 may be configured to couple the wing 104 to the projectile 112 fuselage in any suitable manner. For example, in the present embodiment, the support module 108 is movably connected to the projectile 112 fuselage to facilitate movement of the wing 104 from a stowed position to a flight position. For example, the bearing couple 502 may be configured to selectively deploy the wing 104 from the projectile 112 fuselage. In the present embodiment, the bearing couple 502 comprises a substantially hollow, substantially cylindrical portion of the support module 108 configured to receive a corresponding pin structure (not shown) on the projectile 112 fuselage such that the support module 108 may selectively rotate about the pin structure. The projectile 112 may be configured to omit continuous spars or other structural members extending through the fuselage so the wings can be folded into the stowed position.

The bearing couple 502 may comprise a low-friction internal surface, such as the low friction surface sold under the trademark Teflon®, ball bearings, liquid and/or semi-liquid lubricants, and/or the like. As another example, the bearing couple 502 may comprise notches and/or flanges configured to restrict rotation of the support module 108 about the projectile 112. As yet another example, the bearing couple 502 may be configured to deploy the wing 104 in response to drag forces exerted on the wing 104. The projectile 112 may also be configured to deploy the wing 104. For example, the projectile 112 may include a mechanism, such as a motor or spring, to selectively rotate the wing 104 around the bearing couple 502 to deploy and/or retract the wing 104.

In addition, referring again to FIG. 1, the projectile 112 fuselage may be configured to accommodate the wing 104 in a stowed position, such as including a recess 114 formed in the exterior of the fuselage. The recess 114 may be configured to allow stowage of the wing 104 substantially flush with or substantially within the projectile 112. For example, the recess 114 may be an indentation along the side of the projectile 112 and configured to receive the wing 104. Stowing the wing 104 may protect the wing 104, facilitate firing the projectile 112 from a barrel, achieve a specific aerodynamic property, and/or the like.

The recess 114 may substantially conform to the exterior surface 102 of the wing 104. As another example, the recess 114 may substantially accommodate the polymer foam 106 in a given position. The recess 114 may comprise a substantially distinct portion of and comprise the same material as the projectile 112. Alternatively, the recess 114 may be a distinct component coupled to the projectile 112 and comprise a substantially disparate material. The recess may be configured according to any relevant criteria, such as the operating environment of the projectile 112, chemical interaction between the various materials of the system, required durability of the recess 114, and/or the like.

The module cover 210 of the support module 108 covers the connection between the wing 104 and the projectile 112 fuselage. The module cover 210 may be configured to provide an aerodynamic surface regardless of the position of the polymer foam 106. For example, the module cover 210 of the support module 108 may provide a portion of the wing 104 surface. As another example, the module cover 210 of the support module 108 may comprise a minimal portion of the exterior surface 102 of the control surface 104. In this embodiment, the component of either lift and/or drag force as a consequence of the module cover 210 may be negligible.

The support module 108 may further include the brace 504 to support the polymer foam 106. In some embodiments, the brace 504 may be omitted, for example if the polymer foam 106 exhibits adequate structural characteristics for the intended application. The brace 504 may be configured in any appropriate manner to support the adaptive actuator 105 and/or other elements of the wing 104, such as to add stiffness and/or durability to the wing 104. In the present embodiment, the polymer foam 106 substantially encases the brace 504.

The brace 504 may also be configured to move with the polymer foam 106 as it deforms. For example, the brace 504 may include movable elements. In the present embodiment, referring again to FIGS. 5A-B, the brace 504 comprises a slidably coupled member 510 configured to assume a retracted support position 506 corresponding to the retracted position 206 of the polymer foam 106 and an extended support position 508 corresponding to the extended position 208 of the polymer foam 106. The slidably coupled member 510 may be configured to slide in conformance with the deformation of the polymer foam 106. For example, the slidably coupled member 510 may be configured to couple to the polymer foam 106 such that the deformation of the polymer foam 106 imparts a sliding force on the slidably coupled member 510, causing the slidably coupled member 510 to move with the polymer foam 106. Further, the slidably coupled member 510 may be configured to couple to the polymer foam 106 such that sliding of the slidably coupled member 510 imparts deformation within the polymer foam 106. As another example, the slidably coupled member 510 may be independently moved, as by a rack and pinion gear, a solenoid, an electric motor, and/or other motive force.

Figure 6A:
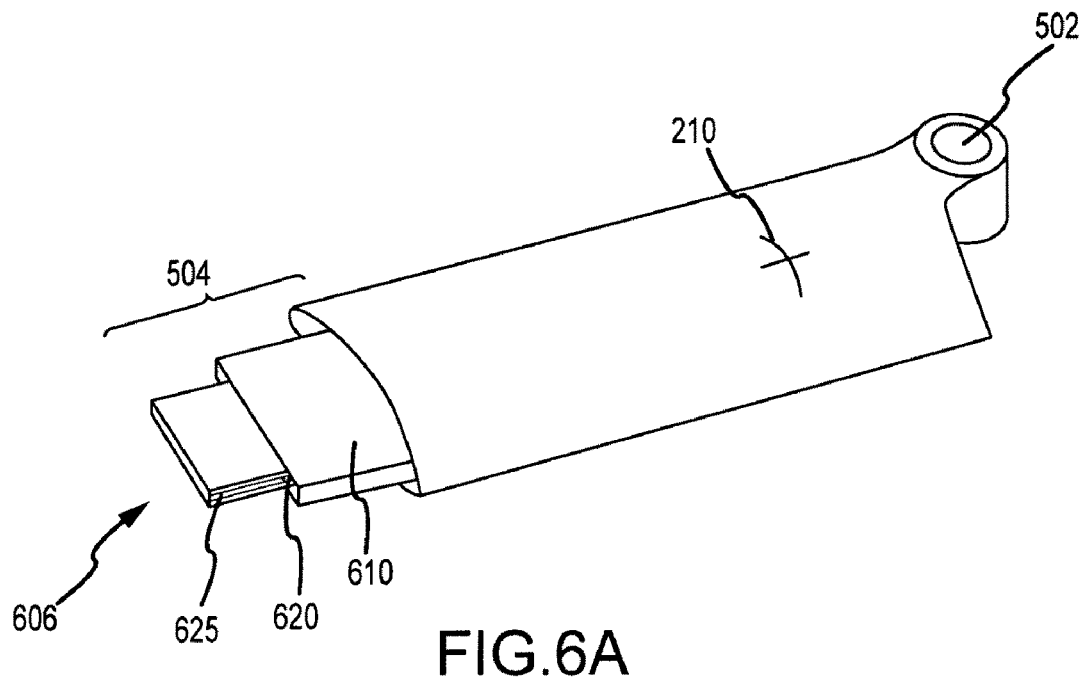
FIGS. 6A-B are views of an alternative support module.
Figure 6B:
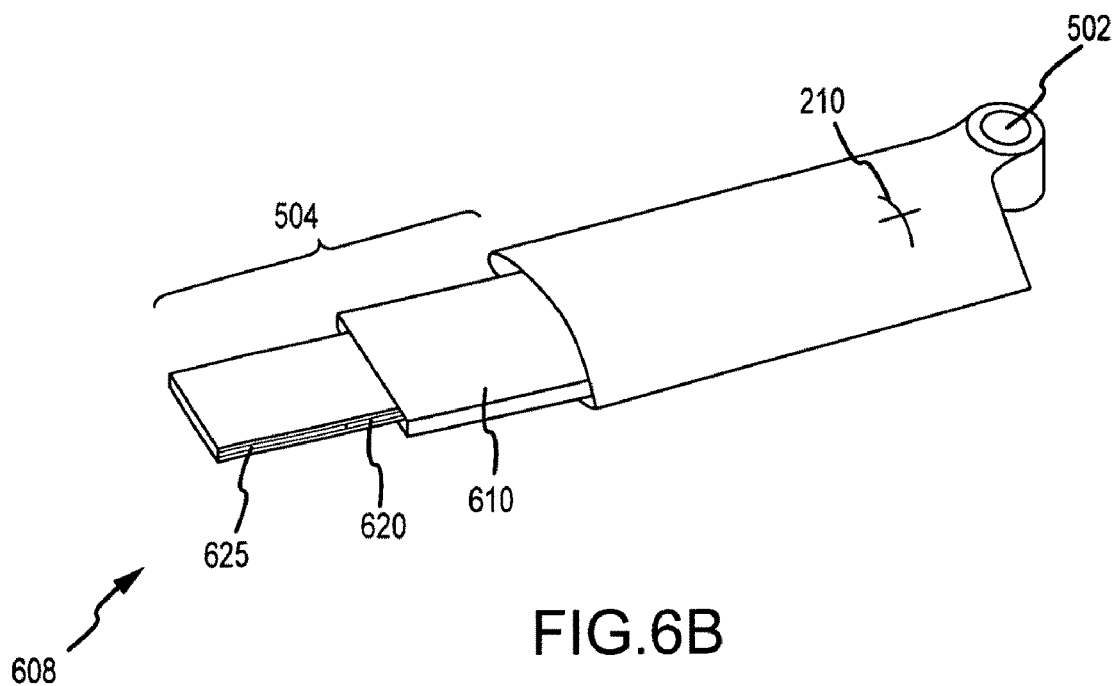

In an alternative embodiment, the brace 504 may comprise a plurality of nesting concentric elements, such as a plurality of hollow structural sections configured to slide substantially concentrically with respect to each other. Referring to FIG. 6A-B, the brace 504 may include concentric sections 610 configured to support the adaptive actuator 105 and/or other elements of the wing 104, such as to add stiffness and/or durability to the wing 104. The concentric sections may also be configured to move with the polymer foam 106 as the polymer foam 106 deforms. For example, the concentric section 610 may assume a retracted support position 606 corresponding to the retracted position 206 of the polymer foam 106 and an extended support position 608 corresponding to the extended position 208 of the polymer foam. More specifically, in the retracted support position 606, at least one element of the concentric sections 610 at least partially nests within another section. In the extended support position 608, the concentric section 610 extends outward from the other section to extend the brace 504.

To accommodate movement of the alternative brace 604 implementation between a retracted support position 606 and an extended support position 608, the nesting polyhedrons may comprise bearings and/or other systems and material configured to reduce friction and/or guide movement among the various elements of the alternative brace 604 implementation. In the present alternative embodiment, at least one interface of each concentric section 610 is outfitted with a bearing 620 and a groove 625 configured to receive the bearing. Movement of the concentric sections may be constrained to the interface between the bearing 620 and the groove 625 and friction may be predictably maintained. The interface between the bearing 620 and groove 625 may comprise a low-friction internal surface such as the low-friction surface sold under the trademark Teflon®, ball bearings, liquid and/or semi-liquid lubricants, and/or the like. Further, the interface may comprise notches and/or flanges configured to restrict movement of the concentric section with respect to each other.

The slidably coupled member 510, 610 may comprise one or more structures configured to stow and deploy within a fixed portion of the support module 108. For example, the slidably coupled member 510, 610 may comprise one or more rectangular pieces configured to extend and retract. As another example, the slidably coupled member 510, 610 may comprise one or more linkages configured to extend and retract.

Figure 7:
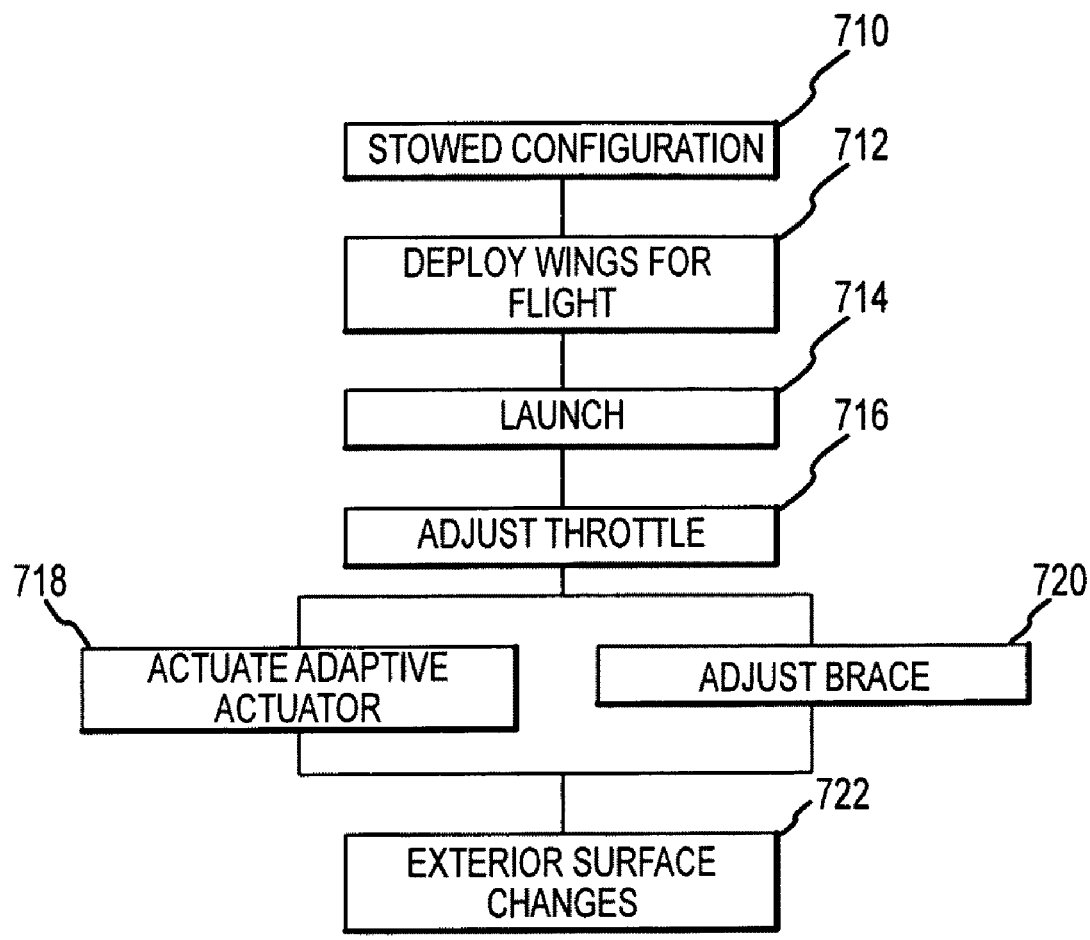
FIG. 7 is a flowchart displaying operation of a selectively adjustable control surface.

In operation, referring to FIG. 7, the control system 110 may control the deployment of the wing 104 and/or the polymer foam 106 according to desired flight characteristics. For example, the projectile 112 may be stowed with the wing 104 rotated into the recess 114 to reduce the overall size of the projectile 112 and resist damage (710). Alternatively, the wing 104 may be fixed to the fuselage in the flight position.

The projectile 112 may be launched with the wings 104 deployed for flight, such as from a runway. The wings 104 may be deployed from the stowed position in any suitable manner, such as manually or automatically (712), and the projectile may then be launched (714). Alternatively, the projectile 112 may be launched with the wings 104 in the stowed position, for example from a gun barrel or a submarine, and the wings 104 may deploy after launch. The wings 104 may deploy at any appropriate time after launch, such as immediately after clearing the gun barrel or the water, after a time delay, or in response to a signal from the control system 110. Upon deployment, the wings 104 move to a flight position. In the present embodiment, the wings 104 rotate around the bearing couple 502 to move into the flight position. In addition, the wings 104 may be locked into position for flight.

During flight, the control system 110 may control the exterior surface 102 of the wings 104 via actuation of the adaptive actuator 105. For example, the control system 110 may reduce airspeed by reducing the engine output (716) and, to maintain lift, extend the wings 104. The control system 110 may provide the relevant signal to the adaptive actuator 105 and/or the support module 108. In the present embodiment, the polymer foam 106 responds by deforming outwardly away from the projectile 112 fuselage (718), thus extending the wing 104 and creating additional exterior surface 102 area (722). The polymer foam 106 may extend longitudinally without significant deformation in the cross-section of the polymer foam 106. As the wing 104 extends, the brace 504 may extend as well (720), providing support for the additional length of the wing 104. Conversely, the wing 104 may be retracted. In addition, the wing 104 may be deformed for other purposes, such as to control the path of the projectile and the like.

The use of an adaptive actuator 105 comprised of polymer foam 106 may have a number of consequences with respect to operation of the system. For example, the polymer foam 106 may be configured to have a first position wherein the shape memory foam has a first length and a second position wherein the shape memory foam has a second length four times greater than the first length. In the event that the shape memory foam is deformed pursuant to modification of the wing length 204 and the support structure 510, 610 is configured to expand by a factor of three, the shape memory material would be in compression during all phases of deployment. Being in compression may substantially reduce the likelihood of tearing the adaptive actuator 105 or exterior surface 102 due to localized tensile stresses.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present invention has been described above with reference to a preferred embodiment. However, changes and modifications may be made to the preferred embodiment without departing from the scope of the present invention. These and other changes or modifications are intended to be included within the scope of the present invention, as expressed in the following claims.

We claim:

1. A vehicle, comprising:

a fuselage; and a control surface attached to the fuselage, comprising:

an exterior surface, wherein a surface area magnitude of the exterior surface is adjustable; and an adaptive actuator connected to the exterior surface and configured to adjust the surface area magnitude of the exterior surface, wherein the adaptive actuator comprises a polymer foam.

2. A vehicle according to claim 1, wherein the polymer foam comprises a shape memory material.

3. A vehicle according to claim 1, wherein the adaptive actuator is configured to at least one of expand and contract at least 200% of an original length of the polymer foam in a selected direction.

4. A vehicle according to claim 1, wherein the adaptive actuator is configured to adjust the surface area magnitude according to a speed of the vehicle.

5. A vehicle according to claim 1, wherein the exterior surface comprises an exterior surface of the polymer foam and wherein at least a portion of the exterior surface is substantially free of porosity.

6. A vehicle according to claim 1, wherein the exterior surface is configured to at least one of expand and contract in length substantially perpendicular to a direction of travel of the vehicle.

7. A vehicle according to claim 1, wherein the control surface is configured to move from a stowed position to a flight position.

8. A vehicle according to claim 1, further comprising a support module, wherein the polymer foam at least partially surrounds the support module.

9. A vehicle according to claim 8, wherein the support module comprises a movable element configured to at least one of extend and retract according to a movement of the polymer foam.

10. A projectile, comprising:
a fuselage; and
a deployable wing attached to the fuselage, comprising:
an exterior surface; and
an adaptive actuator supporting the exterior surface and configured to adjust a surface area of the exterior surface, wherein:
the adaptive actuator comprises a polymer foam attached to the exterior surface;
the polymer foam is configured to at least one of extend and retract; and
the exterior surface is configured to at least one of expand and contract in response to the polymer foam.

11. A projectile according to claim 10, wherein the polymer foam comprises a shape memory material.

12. A projectile according to claim 10, wherein the polymer foam is configured to at least one of expand and contract at least 200% of an original length of the shape memory material in a selected direction.

13. A projectile according to claim 10, wherein the adaptive actuator is configured to adjust the surface area according to a speed of the projectile.

14. A projectile according to claim 10, wherein the exterior surface comprises an exterior of the polymer foam and wherein at least a portion of the exterior surface is substantially free of porosity.

15. A projectile according to claim 10, wherein the exterior surface is configured to at least one of expand and contract in length substantially perpendicular to a direction of travel of the projectile.

16. A projectile according to claim 10, wherein the deployable wing is configured to move from a stowed position to a flight position.

17. A projectile according to claim 10, wherein the deployable wing further comprises a support module, wherein the polymer foam at least partially surrounds the support module.

18. A projectile according to claim 17, wherein the support module comprises a movable element configured to at least one of extend and retract according to a movement of the polymer foam.

19. A method of deploying a wing having an exterior surface, wherein the wing is coupled to a fuselage of a vehicle, the method comprising:
providing an actuation signal; and
deforming a polymer foam in response to the actuation signal to thereby adjust a surface area magnitude of the exterior surface of the wing.

20. The method of deploying a wing according to claim 19, further comprising moving the wing from a stowed position within the fuselage to a flight position.

21. The method of deploying a wing according to claim 19, wherein deforming the polymer foam comprises deforming the polymer foam in response to a speed of the wing.

22. The method of deploying a wing according to claim 19, wherein deforming the polymer foam comprises at least one of expanding and contracting a length of the polymer foam in a direction transverse to a travel direction of the wing.

23. The method of deploying a wing according to claim 19, wherein the exterior surface is integrated into the polymer foam and wherein at least a portion of the exterior surface is graded and substantially free of porosity.

24. The method of deploying a wing according to claim 19, wherein the polymer foam comprises a shape memory material.

* * * * *